(12) United States Patent
Goebel

(10) Patent No.: US 7,672,982 B2
(45) Date of Patent: Mar. 2, 2010

(54) SYSTEMS, METHODS, AND COMPUTER-USABLE MEDIUM FOR DEFRAGMENTING A WINDOWS NT FILE SYSTEM VOLUME

(75) Inventor: David Allen Goebel, Vashon, WA (US)

(73) Assignee: Raxco Software, Inc., Gaithersburg, MD (US)

( * ) Notice: Subject to any disclaimer, the term of this patent is extended or adjusted under 35 U.S.C. 154(b) by 143 days.

(21) Appl. No.: 11/624,507

(22) Filed: Jan. 18, 2007

(65) Prior Publication Data

US 2008/0177699 A1 Jul. 24, 2008

(51) Int. Cl.
*G06F 12/00* (2006.01)
*G06F 17/30* (2006.01)

(52) U.S. Cl. .......................... 707/205; 707/3; 707/202; 707/204; 711/170

(58) Field of Classification Search ........................ None
See application file for complete search history.

(56) References Cited

U.S. PATENT DOCUMENTS 5,930,828 A * 7/1999 Jensen et al. ................. 711/170

2006/0253713 A1 * 11/2006 Terranova et al. ........... 713/194

* cited by examiner

*Primary Examiner*—Greta L Robinson
*Assistant Examiner*—James J Wilcox
(74) *Attorney, Agent, or Firm*—Baker Botts, LLP

(57) ABSTRACT

A method of defragmenting a Windows NT file system volume includes the step of selecting a file record which is stored in a master file table associated with the Windows NT file system volume, in which one or more non-resident attributes are associated with the file record, and data associated with one or more non-resident attributes is stored outside the file record in one or more data extents. The method also includes the step of querying the one or more data extents without opening the one or more non-resident attributes. For example, the one or more data extents may be queried using a FSCTL_GET_NTFS_FILE_RECORD command. Moreover, the method includes the step of determining whether to defragment the one or more non-resident attributes based on information obtained from querying the one or more data extents. For example, the information may include a location of the one or more non-resident attributes.

8 Claims, 1 Drawing Sheet

SYSTEMS, METHODS, AND COMPUTER-USABLE MEDIUM FOR DEFRAGMENTING A WINDOWS NT FILE SYSTEM VOLUME

BACKGROUND OF THE INVENTION

1. Field of the Invention

The present invention relates generally to systems, methods, and computer-usable medium for defragmenting a Windows NT file system volume. In particular, the present invention is directed towards systems, methods, and computer-usable medium for defragmenting a Windows NT file system volume, in which data associated with a non-resident attribute is stored in data extents, the data extents are queried without opening the non-resident attribute, e.g., by using a FSCTL_GET_NTFS_FILE_RECORD command, and various non-resident attributes are selectively defragmented based on information obtained from querying the data extents, e.g., based on a location of each non-resident attribute.

2. Background of the Invention

The structure of a Windows NT file system begins with a volume which corresponds to a logical partition on a disk. A disk may comprise one or more volumes, and each volume may comprise a series of files which are stored as a collection of attributes. Each file attribute may be stored as a separate stream of bytes within a file. A Windows NT file systems keeps track of the files of a volume in a relational database called a master file table, which acts as a table of contents for the volume by storing a file record for each file on the volume. If a particular file is too large for all of the attributes of the file to be stored in the file record, which generally is the case, the Windows NT file system begins a series of expansions to move the attributes of the particular file out of the file record and to store the attributes as non-resident blocks of data called data extents, and the data extents store data associated with the non-resident attributes.

In the normal course of computing on an operating system, files are created, extended, truncated, and deleted. This process leads to the creation of gaps in the Windows NT file system volume. Consequently, large areas of free space that are present early in the Windows NT file system volume's life will break down into smaller free areas throughout the Windows NT file system volume, and it may become necessary to fragment new files in order to store the new files in the Windows NT file system volume, which impedes performance. In order to improve system performance, it is desirable to regularly defragment the Windows NT file system volume.

Systems and methods for defragmenting a Windows NT file system volume are known in the art. In one known method for defragmenting a Windows NT file system volume, a file record which is stored in a master file table is selected, and a non-resident attribute associated with the file record is opened and its extents queried using a FSCTL_GET_RETRIEVAL_POINTERS command. Based on information which is obtained from opening the non-resident attribute and using the FSCTL_GET_RETRIEVAL_POINTERS command, e.g., the location of the non-resident attribute, it then is determined whether to defragment the non-resident attribute.

Nevertheless, in such known methods for defragmenting a Windows NT file system volume, in order to determine whether to defragment each non-resident attribute, it is necessary to open each non-resident attribute. Each time that a non-resident attribute is opened, the operating system consumes memory. Thus, in the known method for defragmenting a Windows NT file system volume, it is necessary to open each non-resident attribute prior to determining whether to defragment the non-resident attribute, such that each non-resident attribute is opened regardless of whether or not the non-resident attribute ultimately is subjected to defragmentation. Moreover, disk capacities are growing at a faster rate than memory capacities, especially with respect to large servers. Therefore, the problems associated with memory usage from opening non-resident attributes using the known method for defragmenting a Windows NT file system volume will increase in the future.

SUMMARY OF THE INVENTION

Therefore, a need has arisen for systems, methods, and computer-usable medium for defragmenting a Windows NT file system volume that overcome these and other problems associated with the related art. A technical advantage of the present invention is that the data extents are queried without opening the non-resident attribute, e.g., by using a FSCTL_GET_NTFS_FILE_RECORD command, and various non-resident attributes are selectively defragmented based on information obtained from querying the data extents, e.g., based on a location of the non-resident attribute. If it is determined that a non-resident attribute should be defragmented, the non-resident attribute is opened, however, if it is determined that the non-resident attribute does not need to be defragmented, the non-resident attribute is not opened. As such, in the present invention, it is not necessary to open all of non-resident attributes, which reduces the amount of memory consumed by the operating system during defragmentation.

According to an embodiment of the present invention, a computer-usable medium has computer-readable instructions stored thereon for execution by a processor, and the processor performs a method comprising selecting a file record which is stored in a master file table associated with a Windows NT file system volume, in which at least one non-resident attribute is associated with the file record, and data associated with at least one non-resident attribute is stored outside the file record in at least one data extent; querying the at least one data extent without opening the at least one non-resident attribute; and determining whether to defragment the at least one non-resident attribute based at least on information obtained from querying the at least one data extent.

According to another embodiment of the present invention, a system for defragmenting a Windows NT file system comprises means for selecting a file record which is stored in a master file table associated with the Windows NT file system volume, in which at least one non-resident attribute is associated with the file record, and data associated with at least one non-resident attribute is stored outside the file record in at least one data extent. The system also comprises means for querying the at least one data extent without opening the at least one non-resident attribute, and means for determining whether to defragment the at least one non-resident attribute based at least on information obtained from querying the at least one data extent.

According to yet another embodiment of the present invention, a method of defragmenting a Windows NT file system volume comprises the step of selecting a file record which is stored in a master file table associated with the Windows NT file system volume, in which at least one non-resident attribute is associated with the file record, and data associated with at least one non-resident attribute is stored outside the file record in at least one data extent. The method also comprises the steps of querying the at least one data extent without opening the at least one non-resident attribute, and determining whether to defragment the at least one non-resident attribute based at least on information obtained from querying the at least one data extent.

Other objects, features, and advantage will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawing.

DETAILED DESCRIPTION OF EMBODIMENTS OF THE INVENTION

Figure 1:
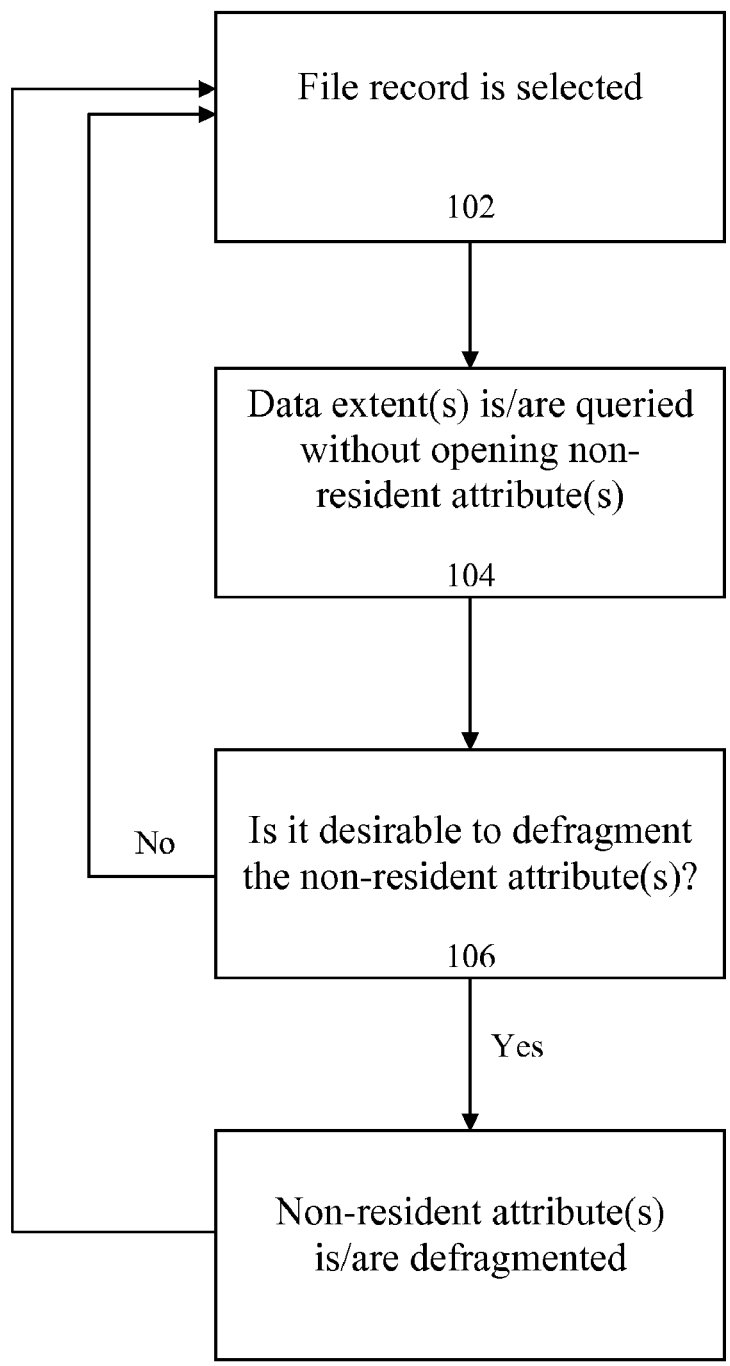
FIG. 1 is a flow chart of a method for defragmenting a Windows NT file system volume, according to an embodiment of the present invention.

Embodiments of the present invention, and their features and advantages, may be understood by referring to FIG. 1.

Referring to FIG. 1, a method 100 of defragmenting a Windows NT file system volume according to an embodiment of the present invention is depicted. In step 102, a file record is selected. The file record is stored in a master file table associated with the Windows NT file system volume, and the file record may comprise at least one resident attribute. A resident attribute may be an attribute that takes up a relatively small amount of storage space, such that it may be directly stored in the file record. For example, the name of the file, modification and access date/time stamps, and the like may be resident for each file. Moreover, at least one non-resident attribute may be associated with the file record. Specifically, if an attribute requires more space than is available within the file record, the attribute is stored outside the file record as non-resident blocks of data called data extents, and at least one data extent stores data associated with the non-resident attribute. Often, a plurality of data extents store the data associated with the at least one non-resident attribute, and in that case the non-resident attribute is said to be fragmented.

In step 104, the at least one data extent is queried without opening the at least one non-resident attribute. For example, the at least one data extent may be queried using a FSCTL_GET_NTFS_FILE_RECORD command, which takes a handle to the volume and returns a raw file record, and the raw contents are parsed to enumerate all of the non-resident attributes for a given file. In step 106, it is determined whether to defragment the at least one non-resident attribute based at least on information obtained from querying the at least one data extent. For example, the information obtained from querying the at least one data extent may indicate a location of the at least one non-resident attribute, and the at least one non-resident attribute may be defragmented when the location of the at least one non-resident attribute indicates that an amount of fragmentation of the at least one non-resident attribute is greater than a predetermined amount of fragmentation. Once it is determined that it is desirable to defragment the at least one non-resident attribute, the at least one non-resident attribute may be defragmented using any known method for defragmenting a Windows NT file system. Exemplary methods for defragmenting a Windows NT file system are described in U.S. Pat. No. 5,398,142 to Davy, which is entitled "Method for Eliminating File Fragmentation and Reducing Average Seek Times in a Magnetic Disk Media Environment," and is assigned on its face to Raxco, Inc. of Rockville, Md., the disclosure of which is incorporated herein by reference in its entirety. For example, after determining that it is desirable to defragment the at least one non-resident attribute, the at least one non-resident attribute may be opened, and at least one non-resident attribute then may be defragmented using a FSCTL_MOVE_FILE command.

Moreover, it will be understood by those of ordinary skill in the art that method 100 may be implemented by a computer-usable medium having computer-readable instructions stored thereon for execution by a processor to perform method 100, or a system which comprises means, e.g., software, for performing method 100.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or from a practice of the invention disclosed herein. It is intended that the specification and the described examples are consider exemplary only, with the true scope of the invention indicated by the following claims.

What is claimed is:

1. A computer-readable storage medium having computer-readable instructions stored thereon for execution by a processor to perform a method for defragmenting a Windows NT file system volume, the method comprises the steps of:

selecting a file record which is stored in a master file table associated with the Windows NT file system volume, wherein at least one non-resident attribute associated with the file record, and data associated with the at least one non-resident attribute is stored outside the file record in at least one data extent, and wherein the at least one non-resident attribute is an attribute of the file record which requires more disk space than is available within the file record, and the data extent comprises at least one data block located outside of the file record;

querying the at least one data extent without opening the at least one non-resident attribute;

determining whether to defragment the at least one non-resident attribute based at least on information obtained from querying the at least one data extent; and defragmenting the at least one non-resident attribute when a location of the at least one non-resident attribute indicates that an amount of fragmentation of the at least one non-resident attribute is greater than a predetermined amount of fragmentation.

2. The computer-readable storage medium of claim 1, wherein the step of querying the at least one data extent comprises the sub-step of querying the at least one data extent using a FSCTL_GET_$_{NTFS\_}$FILE_RECORD command.

3. The computer-readable storage medium of claim 2, wherein the information obtained from querying of the at least one data extent comprises the location of the at least one non-resident attribute.

4. The computer-readable storage medium of claim 1, wherein the step of defragmenting the at least one non-resident attribute comprises the sub-steps of:

after determining to defragment the at least one non-resident attribute, opening the at least one non-resident attribute; and defragmenting the at least one non-resident attribute using a FSCTL_MOVE_FILE command.

5. A computer-implemented method of defragmenting a Windows NT file system volume, comprising the steps of:

selecting a file record which is stored in a master file table associated with the Windows NT file system volume, wherein at least one non-resident attribute associated with the file record, and data associated with at least one non-resident attribute is stored outside the file record in at least one data extent, and wherein the at least one non-resident attribute is an attribute of the file record which requires more disk space than is available within the file record, and the data extent comprises at least one data block located outside the file record;

querying the at least one data extent without opening the at least one non-resident attribute;

determining whether to defragment the at least one non-resident attribute based at least on information obtained from querying the at least one data extent, and defragmenting the at least one non-resident attribute when a location of the at least one non-resident attribute indicates that an amount of fragmentation of the at least one non-resident attribute is greater than a predetermined amount of fragmentation.

6. The computer-implemented method of claim 5, wherein the step of querying the at least one data extent comprises the sub-step of querying the at least one data extent using a FSCTL_GET_NTFS_FILE_RECORD command.

7. The computer-implemented method of claim 6, wherein the information obtained from querying of the at least one data extent comprises the location of the at least one non-resident attribute.

8. The computer-implemented method of claim 5, wherein the step of defragmenting the at least one non-resident attribute comprises the sub-steps of:

after determining to defragment the at least one non-resident attribute, opening the at least one non-resident attribute; and defragmenting the at least one non-resident attribute using a FSCTL_MOVE_FILE command.

* * * * *